Aug. 25, 1964   G. SPONGBERG ETAL   3,145,765
SCREEN ASSEMBLY
Filed Aug. 15, 1961   2 Sheets-Sheet 1
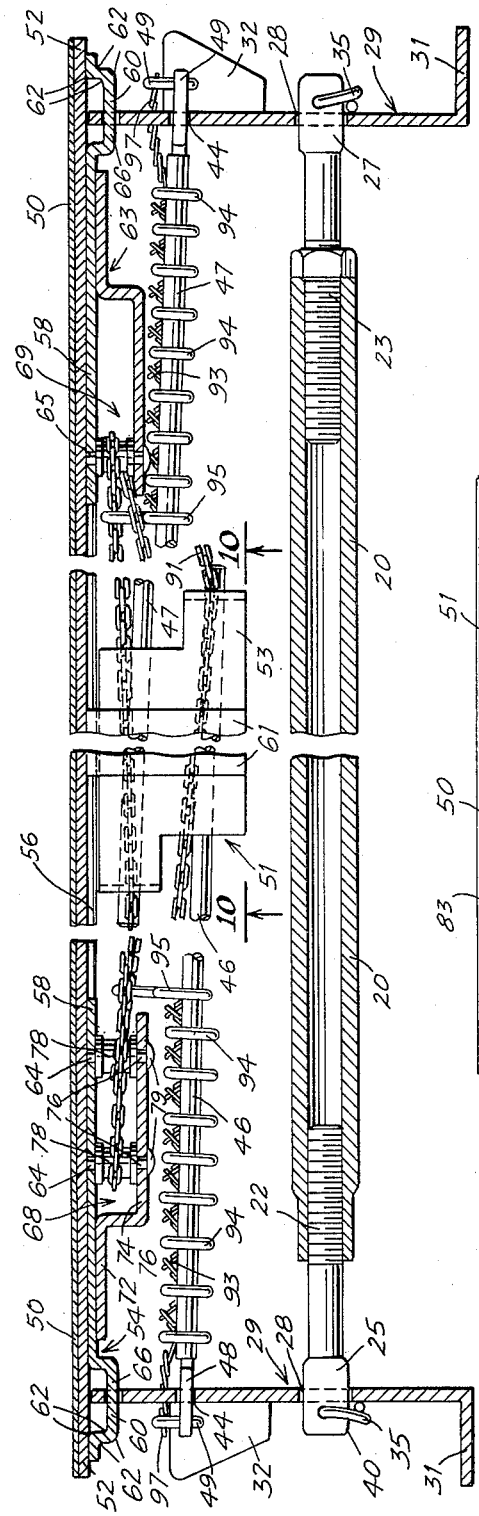
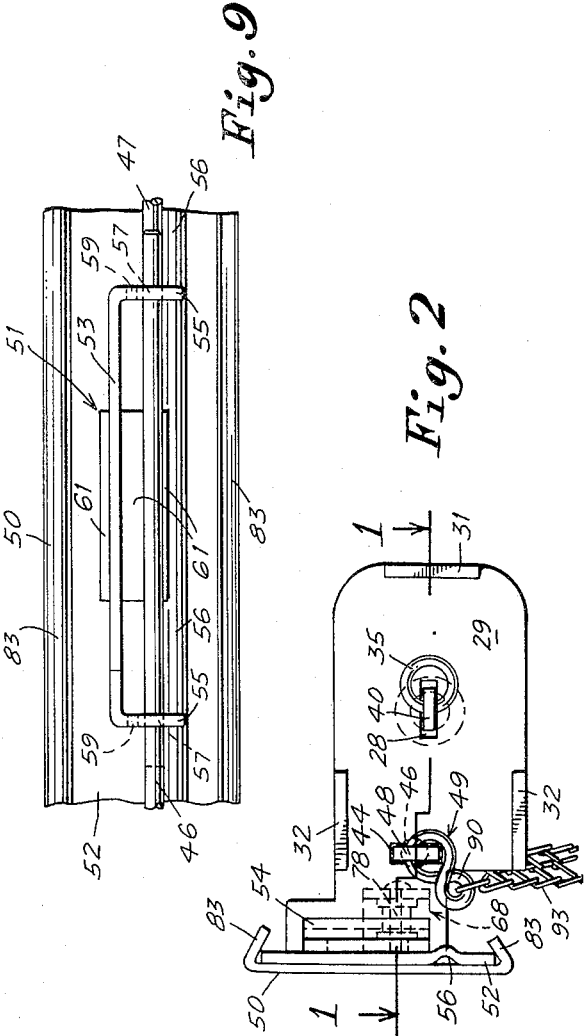
INVENTORS
Gordon Spongberg
Brook J. Tarbox
Ralph A. Sittnick
BY Diggins & LeBlanc
ATTORNEYS Aug. 25, 1964    G. SPONGBERG ETAL    3,145,765
SCREEN ASSEMBLY
Filed Aug. 15, 1961    2 Sheets-Sheet 2
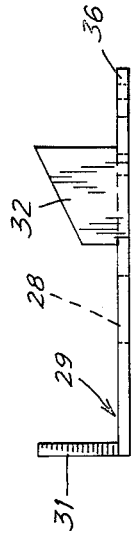
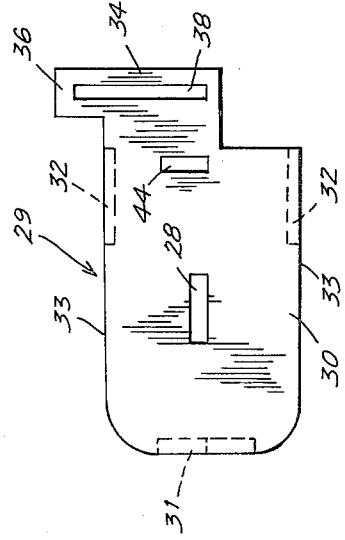
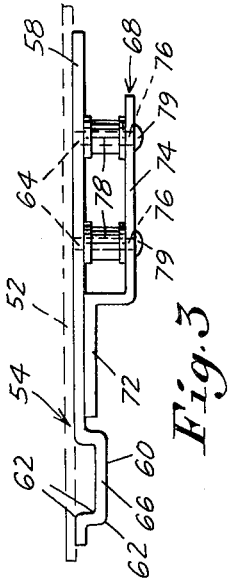
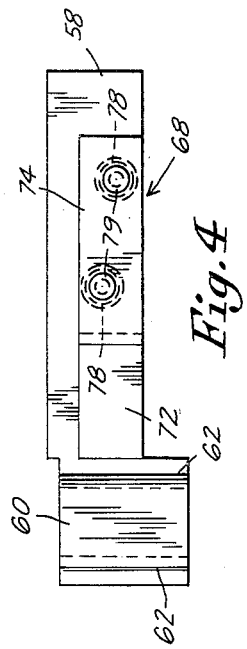
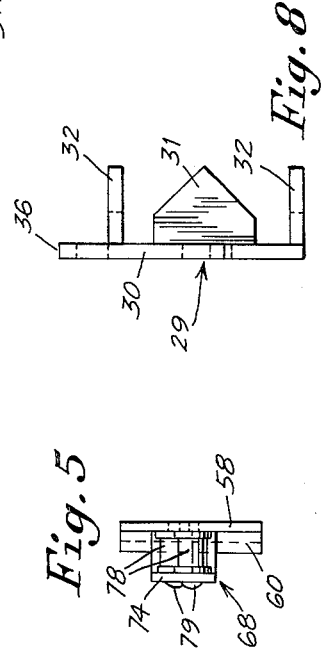
INVENTORS
Gordon Spongberg
Brook J. Tarbox
Ralph A. Sittnick
BY Diggins + Le Blanc
ATTORNEYS

United States Patent Office 3,145,765
Patented Aug. 25, 1964

3,145,765
SCREEN ASSEMBLY
Gordon Spongberg, Milford, Brook J. Tarbox, Cheshire, and Ralph A. Sittnick, Wallingford, Conn., assignors to Wallace Silversmiths, Inc., Wallingford, Conn., a corporation of Connecticut
Filed Aug. 15, 1961, Ser. No. 131,578
5 Claims. (Cl. 160—19)

This invention relates to screen assemblies and more particularly to fireplace screen assemblies.

For a fireplace screen to be commercially practicable under current day competitive conditions, it is advantageous if the screen meets certain basic requisites. For example, it is necessary that the screen be adaptable to fireplace openings having vertical side walls of varying degrees of separation so that a screen of stock construction may be put on the market to service the needs of a variety of types of fireplaces. At the same time, it is advantageous for the screen to be sufficiently versatile in operation to permit its firm and secure mounting between the fireplace side walls in situations in which the walls are not exactly parallel due to defects in the construction of the fireplace.

Fireplace screens are extant which meet these requisites and which are generally commercially acceptable, the screen described in Meyer Patent No. 2,941,591 being an example of such a screen. The Meyer screen assembly contains a support member mounted at each end of a turnbuckle for adjustment in separation of the supports to accommodate the screen assembly to fireplaces having side walls of varying separation. A cornice assembly bearing a screen mounting rod is mounted in cooperation with the support members and maintained in horizontal alignment with them by means of rearwardly extending channel members which engage the upper and lower surfaces of the support members.

While, as aforesaid, such a screen meets commercial requirements, there are a number of disadvantages attendant its use. No doubt the most significant of these is the tendency of the cornice to move out of horizontal alignment with the support members due to the downwardly directed moment arm about an axis coincident with the turnbuckle established by the weight of the screen at a point adjacent the cornice. This tendency for the cornice and screen to move downwardly may result in the formation of a visible space between the upper edge of the cornice and the roof of the fireplace.

The present invention involves a fireplace screen assembly possessing all of the advantages of the Meyer screen aforenoted but possessing none of the recited disadvantages. Specifically, the present invention involves a fireplace screen assembly having a plurality of horizontally adjustable support members, the screen support rod and cornice being mounted on the support members independently of one another so that the cornice will bear none of the weight of a screen carried by the screen support rod. In addition, the present invention contemplates a fireplace screen which is adjustable within wide limits to vary the space between support members so as to accommodate the screen to fireplace openings of significantly varying widths.

It is accordingly a primary object of the present invention to proivde a fireplace screen of improved construction which may be inexpensively manufactured and yet which is sufficiently versatile to permit its accommodation to fireplace openings of varying dimensions.

It is another primary object of the present invention to provided fireplace screen of novel construction having a cornice which bears none of the weight imposed upon the unit by virtue of the weight of the screen element.

It is another principal object of the present invention to provide a novel fireplace screen having support jaws which are pivotable about a vertical axis and, to a limited extent, about a horizontal axis to accommodate the screen to fireplace openings having side walls which are not parallel to one another.

It is another primary object of the present invention to provide a novel fireplace screen which is longitudinally adjustable through a wide range of adjustment.

These and other objects and advantages of the present invention will become more apparent upon reference to the appended specification and claims and drawings wherein:

FIGURE 1 represents a horizontal section through line 1—1 of FIGURE 2, partially broken away for clarity of illustration, showing the components of the novel fireplace screen of the present invention as assembled;

FIGURE 2 represents an end elevational view of the fireplace screen assembly illustrated in FIGURE 1;

FIGURE 3 represents a top plan view of one of the roller plate assemblies forming a constituent part of the novel screen unit of the present invention;

FIGURE 4 represents a front elevational view of the roller plate assembly illustrated in FIGURE 2;

FIGURE 5 represents a right end elevational view of the roller plate assembly illustrated in FIGURES 3 and 4;

FIGURE 6 represents a top plan view of the support member or jaw forming a unit of the novel screen assembly of the present invention;

FIGURE 7 represents a front elevational view of the support jaw illustrated in FIGURE 6;

FIGURE 8 represents a right side elevational view of the support jaw illustrated in FIGURES 6 and 7; and FIGURE 9 represents a partial front elevational view of the screen rod mounting means forming part of the novel screen assembly of the present invention, with the turnbuckle and adjusting chain omitted for clarity of illustration.

As best shown in FIGURES 1 and 2, the novel screen assembly of the present invention comprises a turnbuckle 20 having adjusting screws 22 and 23 at its respective ends, the flat ends 25 and 27 respectively of screws 22 and 23 being positioned in rectangular slots 28 of support jaws 29. If desired, only one of the screws (i.e., screw 22) need be threadedly engaged in a threaded end of turnbuckle 20, the other end of the turnbuckle receiving screw 23 frictionally to permit the latter to move longitudinally in and out of the turnbuckle. As shown in FIGURES 1 and 2, the ends 25 and 27 of screws 22 and 23 are retained in slots 28 by means of retaining rings 35.

As illustrated in FIGURES 6–8, each of the support jaws 29 comprises a main body section 30 (which, in the form shown, is a flat plate) having three pointed gripping prongs, prong 31 being located at one end of plate 30, prongs 32 being identical to one another and being positioned on plate 30 at its edges 33 intermediate prong 31 and the end 34 of the support jaw. As will be apparent, prongs 31 and 32 may be formed on plate 30 from a unitary piece of stock or may be separately formed and welded to the plate. Each of support jaws 29 is provided at its end 34 with a vertically extending tab 36 having a vertical slot 38. Each of the support jaws is also provided with a vertically elongated slot 44 and, as aforestated, a horizontally positioned slot 28.

As shown in FIGURES 1 and 2, one end of each of screen support rods 46 and 47 is mounted within one of slots 44 by means of a mounting extension 48 of rectangular cross-section. The mounting extensions 48 are retained in slots 44 by means of retaining rings 49 which, as shown in FIGURE 2, are shaped in the form of a figure 8 for a reason to be hereinafter described.

The other ends of screen support rods 46 and 47 are supported by a support 51, which is shown partially broken away in FIGURE 1 and more clearly in FIGURE 9. As shown therein, support 51 comprises a U-shaped member 53 having depending arms 55, each of which is provided with two apertures, 57 and 59. Arms 55 are offset from one another so that the aperture 57 of each can supportingly receive the free end of one of the screen support rods, as shown in FIGURE 1. U-shaped member 53 is attached to a backing plate 52 by an L-shaped bracket 61 by welding or the like.

As may best be seen in FIGURES 1 and 2, a cornice 50 is connected to support jaws 29 through the intermediary of a backing plate 52 and slide support members 54 and 63 located at alternative ends of the backing plate. Backing plate 52 is a continuous, elongated flat sheet having a reinforcing rib 56 extending substantially throughout its length. Slide support members 54 and 63 (see particularly FIGURES 3–5) each has a flat body section 58 and a U-shaped end section 60 having rounded fillets 62 and are secured to backing plate 52 by welding or the like. Slide support member 54 is provided with two through apertures 64 and support member 63 with one through aperture 65 for a reason to be set forth below. As shown in FIGURES 1 and 2, the U-shaped end section 60 passes through elongated slot 38 in its respective support jaw 29, this mounting permitting support jaw 29 to ride freely along the base 66 of the U-shaped end section.

As shown in FIGURES 1–5, the screen assembly of the present invention includes roller plate assemblies 68 and 69. Roller plate assembly 68 comprises a Z-shaped element having one leg 72, which may be welded or otherwise secured to body section 58 of slide support member 54, and another leg 74, which is spaced from and in parallel relation to body section 58. Leg 74 is provided with two apertures 76 in alignment with apertures 64 in slide support member 54.

As may best be seen in FIGURE 1, two pulleys 78 are mounted between leg 74 of roller plate assembly 68 and slide support member 54, each pulley being mounted on a rivet 79 passing through each set of aligned apertures 64 and 76. The shank ends of rivets 79 are secured in place by welding them in apertures 64.

Roller plate assembly 69 is otherwise identical to roller plate assembly 68 except that it houses only one pulley instead of two.

As is best shown in FIGURE 2, cornice 50 is generally U-shaped in cross-section, the legs 83 of the U being bent through slightly more than 90° to provide a channel within which backing plate 52 may frictionally ride and be securely held in place.

As will be apparent, the pulleys in roller plate assemblies 68 and 69 are to be utilized in connection with a pull-cord or chain 91 suitably secured to the fireplace screen in a conventional manner to permit the convenient opening and closing of the screen. For this purpose, each of the two screen parts 93 is provided with loops 94 along its upper edge which ride along one of the screen support rods 46 or 47. The innermost loop 95 on each screen part is secured to chain 91 which rides over the pulleys and which passes through apertures 59 in support 51. The endmost portion 97 of each screen is secured to the free loop 90 of its adjacent retaining ring 49.

The entire screen assembly may be readily mounted in a fireplace opening by adjusting the turnbuckle sufficiently to permit the passage of the support jaws between the side walls of the fireplace and then tightening the turnbuckle so that the support jaws lock against the side walls. Since the mounting of support jaws 29 on the U-shaped end sections of slide support members 54 and 63 will permit a reasonable amount of longitudinal movement of the support jaws, the fireplace screen is adapted to be mounted within a reasonably wide range of fireplace openings.

In addition, since there is some play in the connections between the support jaws and the slide support members on the one hand and the support jaws and the turnbuckle on the other, it will be seen that the support jaws may be slightly rotated if necessary both about a horizontal and a vertical axis to accommodate the screen assembly to fireplaces having other than perfectly parallel side walls. This feature will, of course, assure the firm gripping of the fireplace side walls by the support jaws and prevent the screen assembly from being dislodged accidentally or of its own weight.

From the standpoint of aesthetic considerations, the cornice should extend substantially completely from one side wall to the other of the fireplace. Since the instant screen assembly is adapted to be entirely recessed within the fireplace opening, it is clear, therefore, that the cornice to be used in conjunction with the assembly must be custom-made to satisfy the requirements of the particular fireplace in which the assembly is to be installed. Notwithstanding this fact, however, the versatility of the basic sub-assembly of the present fireplace screen (including all elements except the cornice) permits its fabrication as a stock item for use with a variety of fireplace openings, with the particular cornice to be used being individualized to fit the specific needs of a given fireplace. Thus, the versatility of the assembly is maintained without sacrificing the custom finishing of the visible portion of the assembly.

As aforesaid, the fireplace screen of the present invention possesses numerous advantages over comparable fireplace screens presently extant. The present screen may be simply and economically fabricated, is extremely versatile in operation for adaptability to a variety of fireplace openings and includes a cornice structure whose alignment will be maintained regardless of the weight of the screen utilized in the assembly.

While the screen of the present invention has been described particularly with reference for use in connection with a fireplace, it is to be understood that the basic inventive concept is applicable generally to screens of the nature described, whether or not they are to be used as fireplace screens.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for supporting a screen between two vertical walls of varying degrees of separation comprising two rigid integral support members, one of which is adapted to engage one of said walls, the other of which is adapted to engage the other of said walls; each of said support members including at least three spaced apertures, elongated means connecting said support members to one another; said support member connecting means being alternatively adjustable to increase the spacing between said support members to force them into locking engagement with said walls and to decrease said spacing to permit withdrawal of said support members from between said walls; a cornice; and screen support means; the opposite ends of said support member connecting means, said cornice, and said screen support means all being loosely received for limited three-dimensional movement through respective ones of said apertures in said support members.

2. A device as defined in claim 1 wherein each of said apertures is of rectangular cross-section.

3. A device as defined in claim 1 wherein each of said support members is provided with one of said apertures adjacent its end, said one aperture comprising an elongated vertical slot, said cornice including cornice connecting means comprising a longitudinally extending runner near each end of said cornice which passes through said vertical slot and along which the support member adjacent that end of the cornice is slidable for adjustment of the spacing between said support members.

4. A device for supporting a screen between two vertical walls of varying degrees of separation comprising two integral rigid support members, one of which is adapted to engage spaced points of one of said walls, the other of which is adapted to engage spaced points of the other of said walls; elongated means connecting said support members to one another; said support member connecting means being alternatively adjustable to increase the spacing between said support members to force them into locking engagement with said walls and to decrease the spacing to permit withdrawal of said support members from between said walls; each end of said connecting means being loosely directly coupled to its respective support member; a cornice; screen support means; and separate means loosely directly coupling the ends of said screen support means and said cornice individually directly to said support members thereby adapting said support members to be free for limited three-dimensional adjustment relative to said connecting means, said cornice and screen support means; said screen support means being connected to said support members in close proximity to said points.

5. A device for supporting a screen between two vertical walls of varying degrees of separation comprising two support members, having forward and rearward terminal portions, one of said support members being adapted to engage spaced points of one of said walls, the other of which is adapted to engage spaced points of the other of said walls; means connecting said support members to one another; said support member connecting means being alternatively adjustable to increase the spacing between said support members to force them into locking engagement with said walls and to decrease said spacing to permit withdrawal of said support members from between said walls; screen support means directly connected to said support members in close proximity to said points to minimize the generation of any moment arm about any of said points as an axis; a cornice; means connecting said cornice directly to said support members at a point on each of said support members forwardly displaced from said screen support means, so that said cornice bears none of the weight of a screen carried by said screen support means; each of said support members being provided adjacent its forward end with a vertical slot; said cornice connecting means including a longitudinally extending runner near each end of said cornice; each of said longitudinally extending runners loosely passing through the slot in the support member with which it is associated so that each of said runners is mounted for limited three-dimensional adjustment thereof with respect to said support members.

References Cited in the file of this patent

UNITED STATES PATENTS

| | | |
|---|---|---|
| 2,313,496 | Adams | Mar. 9, 1943 |
| 2,594,655 | Junkunc | Apr. 29, 1952 |
| 2,954,656 | Junkunc | Apr. 29, 1952 |
| 2,644,191 | Meyer | July 7, 1953 |
| 2,941,591 | Meyer | June 21, 1960 |
| 3,018,774 | Rubens | Jan. 30, 1962 |

FOREIGN PATENTS

| | | |
|---|---|---|
| 597,572 | Canada | May 10, 1960 |

UNITED STATES PATENT OFFICE
CERTIFICATE OF CORRECTION

Patent No. 3,145,765                                                  August 25, 1964

Gordon Spongberg et al.

It is hereby certified that error appears in the above numbered patent requiring correction and that the said Letters Patent should read as corrected below.

Column 1, line 64, for "proivde" read -- provide --; line 69, for "provided" read -- provide a --; column 6, line 28, for "2,954,656" read -- 2,594,656 --.

Signed and sealed this 27th day of April 1965.

(SEAL)
Attest:

ERNEST W. SWIDER                                      EDWARD J. BRENNER
Attesting Officer                                           Commissioner of Patents